(12) United States Patent
Hou

(10) Patent No.: US 6,249,618 B1
(45) Date of Patent: Jun. 19, 2001

(54) CIRCUIT ARCHITECTURE AND METHOD FOR SWITCHING SENSOR RESOLUTION

(75) Inventor: Alpha Hou, San Jose, CA (US)

(73) Assignee: Syscan, Inc., San Jose, CA (US)

(*) Notice: Subject to any disclaimer, the term of this patent is extended or adjusted under 35 U.S.C. 154(b) by 0 days.

(21) Appl. No.: 09/213,106

(22) Filed: Dec. 18, 1998

(51) Int. Cl.[7] .................................................. G06K 9/20
(52) U.S. Cl. .......................................................... 382/312
(58) Field of Search .................................... 382/312, 318, 382/319, 321, 323, 324; 348/307, 308, 311–324

(56) References Cited

U.S. PATENT DOCUMENTS

| | | | |
|---|---|---|---|
| 4,500,202 | * 2/1985 | Smyth .................................. | 382/147 |
| 4,578,810 | * 3/1986 | MacFarlane et al. ................ | 382/147 |
| 4,679,032 | * 7/1987 | Roschier ............................... | 340/562 |
| 5,325,442 | * 6/1994 | Knapp ................................... | 382/124 |
| 5,815,608 | * 9/1998 | Lange et al. .......................... | 382/312 |
| 5,901,257 | * 5/1999 | Chen et al. ........................... | 382/312 |
| 5,923,794 | * 7/1999 | McGrath et al. ..................... | 382/312 |
| 6,011,859 | * 1/2000 | Kalnitsky et al. .................... | 382/124 |
| 6,035,077 | * 3/2000 | Chen et al. ........................... | 382/312 |

* cited by examiner

Primary Examiner—Jose L. Couso
(74) Attorney, Agent, or Firm—Joe Zheng

(57) ABSTRACT

The disclosed architecture for an image sensor and the associated method employ an internal switching mechanism controlled by a much reduced number of shift registers to facilitate the readout of electronic signals generated by the photodetectors in the image sensor. The switching mechanism comprises resolution switches that can act sequentially or simultaneously so that image resolution can be controlled within the image sensor. Further, the overall performance of the image sensor is improved.

19 Claims, 7 Drawing Sheets

CIRCUIT ARCHITECTURE AND METHOD FOR SWITCHING SENSOR RESOLUTION

BACKGROUND OF THE INVENTION

1. Field of the Invention

The present invention generally relates to image sensing systems and more particularly relates to a circuit architecture and associated method for an image sensor employing an internal mechanism for switching resolutions so as to minimize the number of shift registers in use and increase the overall performance of the image sensor.

2. Description of the Related Art

There are many applications that need an imaging system to convert a target to an electronic format that can be subsequently analyzed, printed, distributed and archived. The electronic format is generally an image of the target. A typical example of the imaging system is a scanner and the target is a sheet of paper from a book or an article. Through the scanner, an electronic or digital image of the paper is generated.

An imaging system generally includes a sensing module that converts a target optically into an image. The key element in the sensing module that converts the target optically to the image is an image sensor comprising an array or matrix of photodetectors responsive to light impinged upon the image sensor. Each of the photodetectors produces an electronic (charge) signal representing the intensity of the light reflected from the target. The electronic signals from all of the photodetectors are readout and then digitized through an analog-to-digital converter to produce digital signal or image of the target.

One very common type of image sensor is a charge coupled device (CCD). Another low cost image sensors, perhaps used more commonly in the future, are made out of complementary metal-oxide semiconductor (CMOS). Generally, a significant number of shift registers are used in both types of the image sensors as auxiliary circuitry to facilitate the readout of the electronic signals. For example, in one type of an image sensor that comprises 1024 (1K) photodetectors, there typically employ 1024 or more shift registers in the image sensor.

It is understood in the art that the area occupied by the large number of shift registers is quite significant compared to the area occupied by photodetectors in a piece of semiconductor that is eventually packaged as an image sensor. The cost of the image sensor would not be further reduced if the size of the image sensor can not be reduced. There is therefore a great need to reduce the size of the image sensor without compromising the overall performance of the image sensor.

CMOS image sensors have many unique characteristics that are being researched to explore possibilities of further performance improvement and cost reduction. One of the desirable possibilities is to determine if the size of a CMOS image sensor can be further reduced while the overall performance is increased. Image sensors of smaller size and improved overall performance will be certainly welcome, especially in consumer electronics markets.

SUMMARY OF THE INVENTION

The present invention has been made in consideration of the above described problems and needs and has particular applications to image sensors used in scanners, digital cameras and computer vision systems.

Many image sensors employ a large number of shift registers to facilitate the readout of electronic signals generated by photodetectors in the image sensors. These shift registers typically occupy a fairly large amount of area in an image sensor. In reality, one of the factors that determine the cost of an image sensor is the number of image sensors a piece of semiconductor wafer of regular size can be cut into. If an image sensor without compromising any performance can be designed smaller, that means that a piece of wafer could produce more sensors and the cost could be reduced significantly.

The disclosed architecture for an image sensor and the associated method employ an internal switching mechanism controlled by a much reduced number of shift registers to facilitate the readout of electronic signals generated by the photodetectors in the image sensor. Further, the overall performance of the image sensor is improved.

According to one embodiment of the present invention, an image sensor comprises an array of photodetectors, each responsive to light impinged thereupon and independently producing an electronic signal after the photodetectors are collectively reset by a reset signal, a multiplexer comprising a plurality of groups of switches, each of the switches coupled to one of the photodetectors; the groups of switches being serially turned on in synchrony with a clock control signal; wherein when one of the groups of switches are turned on, respective electronic signals of the photodetectors coupled by the one of the groups of switches are respectively readout; and a number of resolution switches, each operating in synchrony with the clock control signal and receiving the respective electronic signals.

The image sensor further comprises an amplifier having multiple inputs, each of the inputs coupled to one of the resolution switches and receiving at least one of the respective electronic signals when one of the resolution switches is turned on; wherein the one of the resolution switches receives the one of the respective electronic signals.

Accordingly, an important object of the present invention is to provide a new architecture and method for an image sensor that employ an internal switch mechanism to facilitate the readout of electronic signals generated by the photodetectors in the image sensor.

Other objects, together with the foregoing are attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENTS

In the following detailed description of the present invention, numerous specific details are set forth in order to provide a thorough understanding of the present invention. However, it will become obvious to those skilled in the art that the present invention may be practiced without these specific details. The description and representation herein are the common means used by those experienced or skilled in the art to most effectively convey the substance of their work to others skilled in the art. In other instances, well known methods, procedures, components, and circuitry have not been described in detail to avoid unnecessarily obscuring aspects of the present invention.

Figure 1:
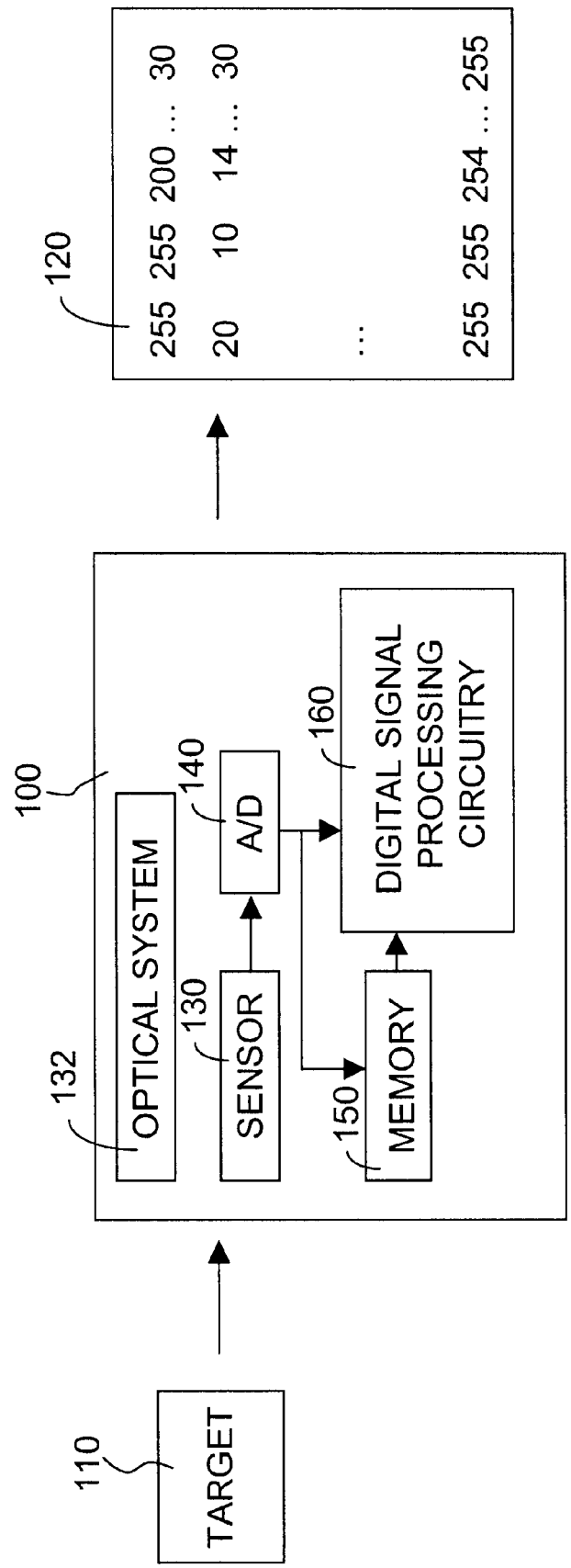
FIG. 1 depicts a schematic diagram showing an imaging system using image sensors in which the present invention can be practiced.

Referring now to the drawings, in which like numerals refer to like parts throughout the several views. FIG. 1 shows a systematic diagram of an imaging system 100 in which the present invention may be practiced. Depending on applications, examples of imaging system 100 may include, but not be limited to, a scanner, a digital camera, or an image acquisition system in which a target 110 is optically converted to an image 120.

When imaging system 100 is a scanner, target 110 is generally a scanning object that may be a sheet of paper. When imaging system 100 is a digital camera, target 110 can be of many possible things such as a scene or a group of objects. When imaging system 100 is an image acquisition system used in machine vision systems, target 110 may be a component being inspected. Nevertheless, the result from imaging system 100 is always the same, namely an intensity (black-and-white) digital image 120 or a color image 120 of target 110.

Image 120 typically is an array of pixels, each having a value between 0 to 255 if presented in an 8-bit format and a different maximum value if presented in other bit formats (10-bit, 12-bit, 14-bit, 16-bit . . . ). To be more specific with the 8-bit format, if a cluster of pixels having values of 255, a spot in target 110 corresponding to the cluster is all white. Conversely if a cluster of pixels having values of 0, a spot in target 110 corresponding to the cluster is all black. Understandably, any pixels having values between 0 and 255 represent the light reflectance variations in target 110. When imaging system 100 is capable of reproducing colors, image 120 typically comprises three individual gray scale images, each generally representing red, green and blue intensity image. In other words, each dot in target 110 is represented by a three-intensity-value vector, such as [23, 45, 129], in a color image produced by imaging system 100.

It is generally understood, regardless the actual applications, imaging system 100 comprises at least an image sensor 130 and an optical system 132. Optical system 132 collects image light from target 110 and focuses the image light upon image sensor 130, thereby an image of target 110 is imprinted onto image sensor 130. As used herein, image or incident light means either reflected light from (opaque) target 110 illuminated by a front light source or the transmitted light from (transparent) target 110 illuminated by a back light source. Typically, image sensor 130, comprising a plurality of photodetectors, is fabricated from Complementary Metal-Oxide Semiconductor (CMOS) and configured as either a one-dimensional array, referred to as linear sensor, or two-dimensional array, referred to as area sensor. The photodetectors are highly sensitive to light and each produces a proportional electronic signal with respect to the strength of the image light. Again as used herein, an electronic signal means a signal generated from a photodetector due to the incident light.

The operation of image sensor 130 often comprises two processes, the first being the light integration process and the second being the readout process. In the light integration process, each photodetector accumulates incident photons of the image light and is reflected as an electronic signal. After the light integration process, the photodetector is stopped from further accumulating photons. Meanwhile the photodetectors are caused to start the readout process during which the electronic signal in each photodetector is individually and serially readout as an analog video signal, via a readout circuitry (amplifier), to a data bus or video bus.

Coupled to the data bus, there is an analog-to-digital (A/D) converter that digitizes the electronic signals from all the photodetectors to digitized signals that can be appropriately and subsequently stored in memory 150. Typically imaging system 100 further comprises a digital signal processing circuitry 160 that, depending on the use of imaging system 100, may adjust, correct, preprocess and compress the digitized signals to eventually output an appropriate digital image or signal.

The digital image or signal is typically loaded to a host computer, such as an IBM compatible computer. The host computer may execute a driver that communicates with imaging system 100. When the image sensor has a particular sensor resolution (number of photodetectors per inch or inch-square), the resolution of the digital image or signal generated from the image sensor corresponds directly to the sensor resolution. If an application requires a lower resolution from the digital image or signal, the driver may execute a process to reduce from the high resolution data to the low resolution using a process like data interpolation process. The resolution reduction process is time consuming and an extra process that may be eliminated and the image can be more efficiently generated in the present architecture.

Figure 2:
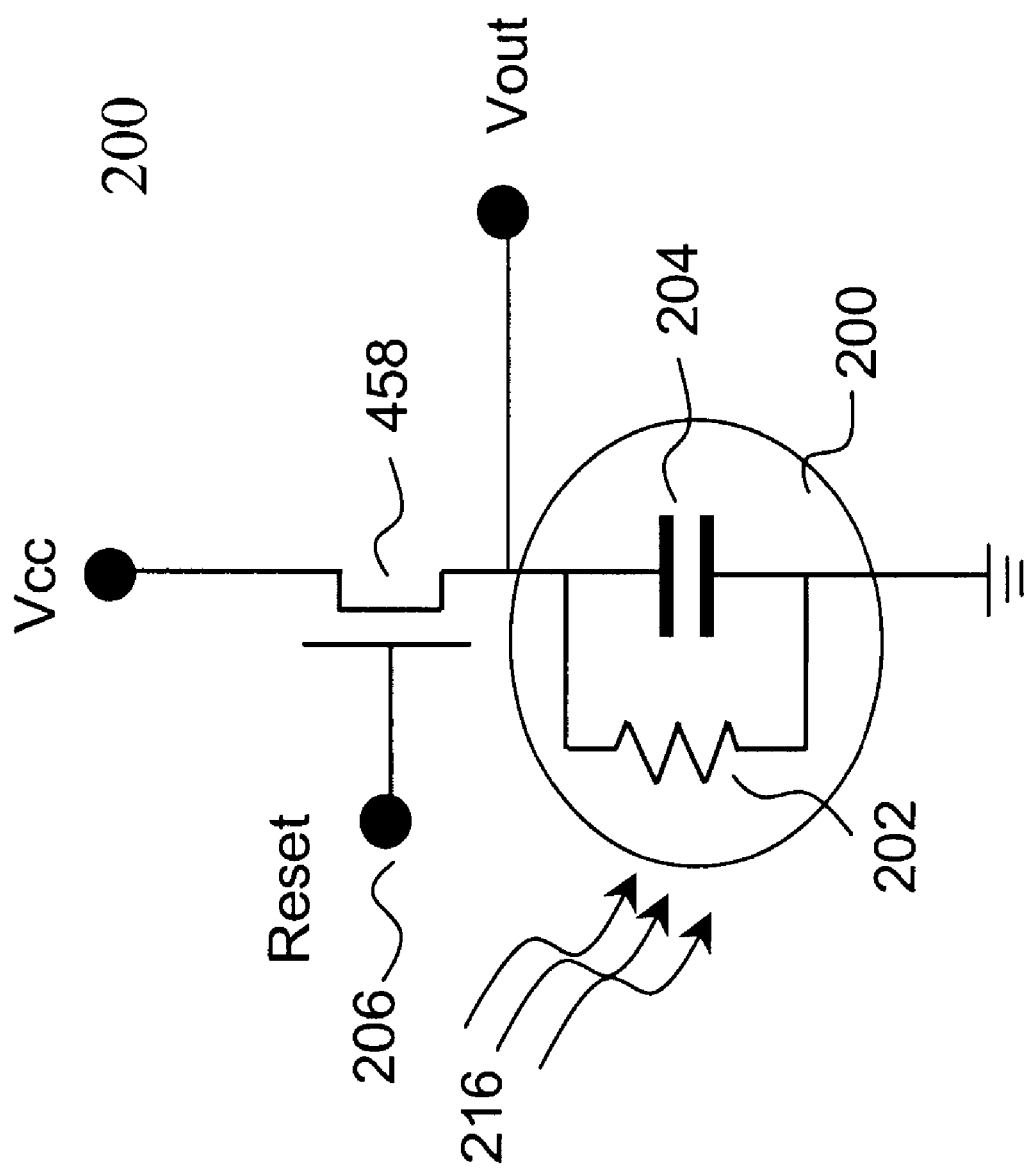
FIG. 2 depicts a CMOS photodetector that is simply modeled as a resistor and a capacitor.

To facilitate the detailed description of the present invention, FIG. 2 depicts a CMOS photodetector 200 that is simply modeled as a resistor 202 and a capacitor 204, a typically circuit of a photodiode (one type of photodetectors). When a reset signal is applied at "Reset" 206, capacitor 204 is fully charged by Vcc through transistor 208, which means that photodetector 200 is ready for light integration or exposure to a scanning object. Inherently, the charge by Vcc to capacitor 204 is stopped.

As more and more incident photons from image light 210 come to photodetector 200, the resistance of resistor 202 decreases. Capacitor 204 starts to discharge through resistor 202. Typically, the higher the photon intensity is, the more photons a photodetector collects, hence the smaller resistance resistor 202 has. Consequently a faster discharge signal Vout yields. In other words, the signal from Vout is proportional to the photons that came to the photodetector and referred to as an electronic signal herein.

Figure 3:
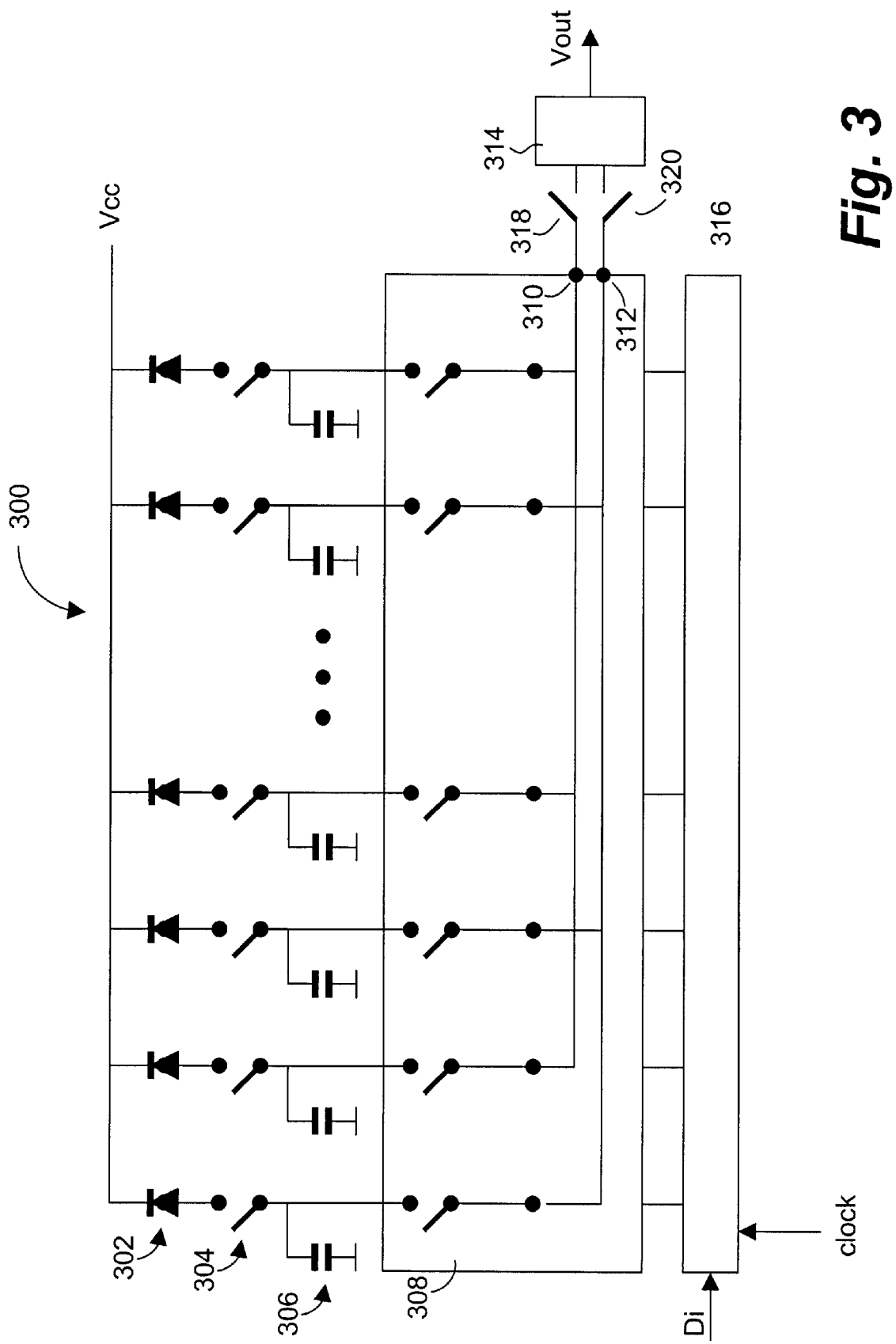
FIG. 3 shows a circuit diagram of a CMOS image sensor that can be in FIG. 1 according to one embodiment of the present invention.

Referring now to FIG. 3, there is shown a circuit diagram of a CMOS image sensor 300 according to one embodiment of the present invention. Image sensor 300 comprises an array of photodetectors 302 modeled as an array of photodiodes. The moment image sensor 300 is ready for operation is the moment that photodetectors 302 have been fully charged to Vcc. As soon as image sensor 300 is activated to image a scanning object preferably illuminated by an illumination source, photodetectors 302 are exposed to reflected light from the illuminated object and caused to discharge from Vcc.

Image sensor 300 further comprises an array of parallel dumping switches 304. Each of switches 304 is coupled to one of photodetectors 302. Switches 304 are collectively controlled by a control signal that also controls the exposure time of image sensor 300. In other words, if the exposure time is 0.02 second, after photodetectors 302 are exposed to the scanning object for the time period, the control signal activates to stop photodetectors 302 from further collecting photons in the reflected light and meanwhile turns on all of parallel dumping switches 304. The closures of parallel dumping switches 304 cause the electronic signals generated in photodetectors 302 to shift to respective capacitors 306.

In parallel connected to capacitors 306 is a multiplexer 308 comprising preferably the same number of switches as the number of capacitors 306. Switches in multiplexer 308 can be structured using an array of switch diodes and turn on and off by an appropriate voltage applied across. According to one embodiment, multiplexer 308 includes two outputs 310 and 312, one 310 connected collectively to every other one of switches in multiplexer 308 and the other 312 connected collectively to every another one switches in multiplexer 308. Both outputs 310 and 312 are coupled to an amplifier 314 through respective resolution switches 318 and 320. With a proper control of the resolution switches, an appropriate analog video signal Vout is produced.

As will be more clearly appreciated below, one of the features of the present invention is the implementation of the resolution switches. The number of the resolution switches employed is related to a number of shift registers in use. For example, there are N photodetectors and hence N switches will be used in multiplexer 308. The N switches are divided into M groups, each group preferably having an identical number of switches, i.e. k=N/M. Ideally multiplexer 308 has k output and there are k resolution switches between the multiplexer and the following amplifier. The switches in each of the group are collectively controlled by one shift register. In other words, a pulse signal output from the shift register turns on the group of switches simultaneously. As a result, electronic signals coupled to the group of switches are simultaneously read out but toggled out respectively by the resolution switches if the electronic signals are wanted to be preserved for a fidelity resolution as the sensor resolution in the resultant image. It can be perceived that readout speed could be increased by a factor of k if the electronic signals are not to be preserved for a k-times lower resolution. The benefits and advantages of the design can be further appreciated by a particular design demonstrated in FIG. 3 and the description below.

The switches in multiplexer 308 are grouped into 2 groups, a first group comprising every other one of the switches and a second group comprising every another one of the switches. To be precise, the first group of switches are those starting $1^{st}$, $3^{rd}$, $5^{th}$, etc. or with an odd number, and the second group of switches are those starting $2^{nd}$, $4^{th}$, $6^{th}$, etc, or with even number. It is understood that the numbers are not the necessity but rather for labeling herein. In an area image sensor, it is preferred to group the switches coupled to the photodetectors for the odd field into one group and the switches coupling to the photodetectors for the even field into another group. In a linear sensor, every other one of the switches are into one group and every another one of the switches are into another group.

The switches in multiplexer 308 controlled by a shift register array 316 that comprises a half number of shift registers. In other words, if there are N photodetectors in image sensor 300, there need only N/2 shift registers in shift register array 316. This is a significant reduction of the shift registers in use given that N is a huge number in reality. It can be appreciated that an image sensor employing the present invention can be designed smaller while the performance thereof is improved.

To fully control the twice number of switches in multiplexer 308, each of the shift registers in shift register array 316 controls two of the switches in multiplexer 308. For example, each of the shift registers controls two adjacent switches in multiplexer 308. To be more specific, a pulse Di that causes switches in multiplexer 308 to turn on serially is shifted from one shift register to another shift register. When Di is shifted out from one shift register that controls two adjacent switches, the two adjacent switches are turned on simultaneously and cause respective electronic signals stored in the respective capacitors (two of capacitors 306) to be readout as outputs 310 and 312.

Between the outputs of multiplexer 308 and amplifier 314, there is a pair of resolution or toggle switches 318 and 320 controlled in synchrony with the switches in multiplexer 308. In the case of demanding a fidelity or high resolution (a resolution that an image sensor can truly represent in the resultant images), switches 318 and 320 are alternately turned on, namely only one of outputs 310 and 312 is coupled to amplifier 314 at one time, which further means that signals at outputs 310 and 312 are respectively readout. In the case of requiring a low resolution, for example only a half of the fidelity resolution, two photodetectors representing an image pixel, switches 318 and 320 are turned on simultaneously, which means signals at outputs 310 and 312 are merged as a combined output.

Figure 4:
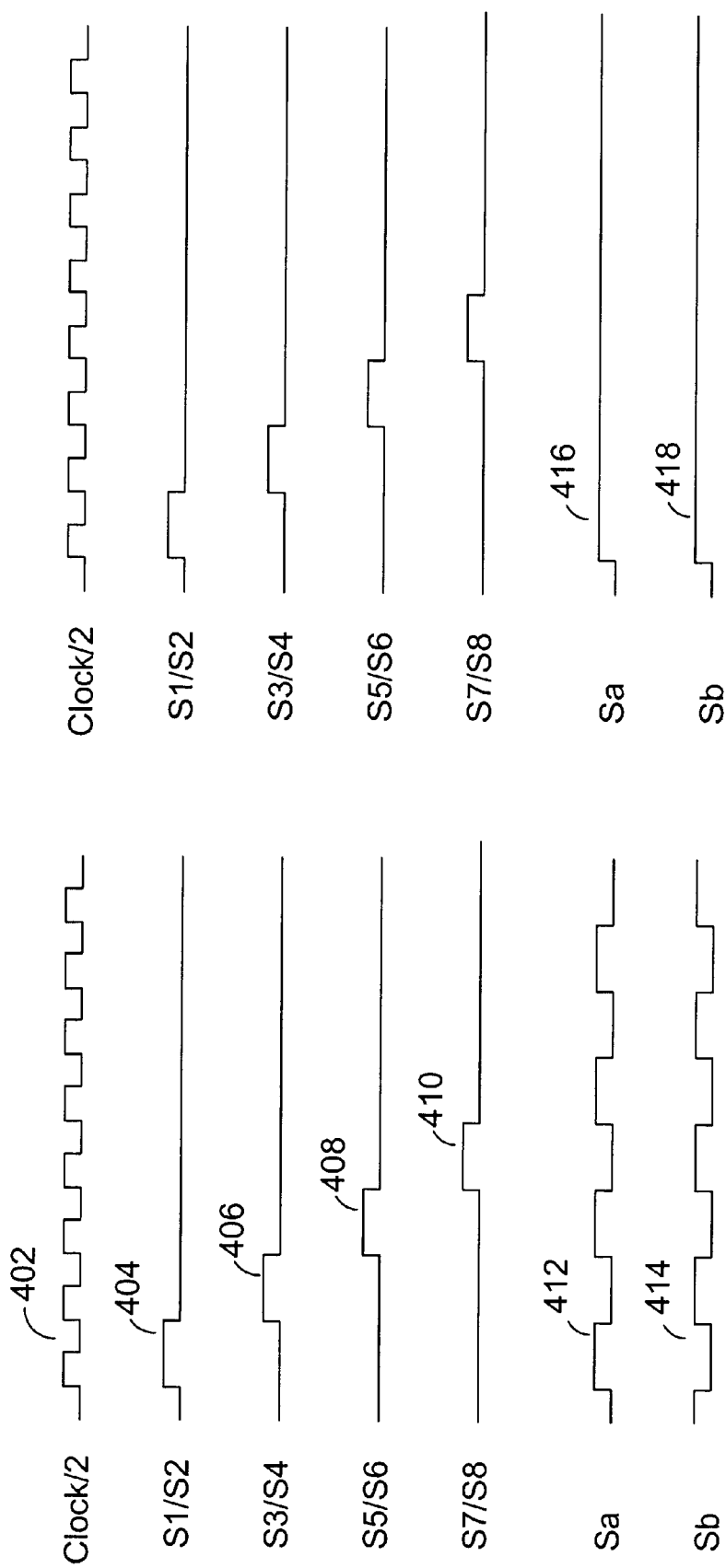
FIGS. 4A and 4B depict a set of control signals respectively for high and low resolution cases and should be understood in conjunction with FIG. 3.

FIGS. 4A and 4B depict a set of control signals respectively for the above high and low resolution cases and should be understood in conjunction with FIG. 3. In FIG. 4A, clock control signal 402 is derived from a central clocking signal preferably generated from an oscillator circuit and input to shift register array 316. As described before, Di is a pulse and also input to shift register array 316. Driven by clock control signal 402, Di shifts and serially turns on two switches in multiplexer 308. Signals 404, 406, 408 and 410 show a pair of switches S1/S2, S3/S4, S5/S6 and S7/S8 are respectively turned on. Synchronized with clock control signal 402, switches 318 and 320 are alternately turned on and off by signals 412 and 414. As a result, electronic signals from the two turned on switches in multiplexer 308 can be distinguishably read out to amplifier 314.

Similarly, FIG. 4B illustrates the same signals except signals controlling switches 318 and 320 are identical. As a result, electronic signals from the two turned on switches in multiplexer 308 can be indiscriminately read out to amplifier 314 that produces the combined output, a lower resolution version of the image sensor.

Figure 5:
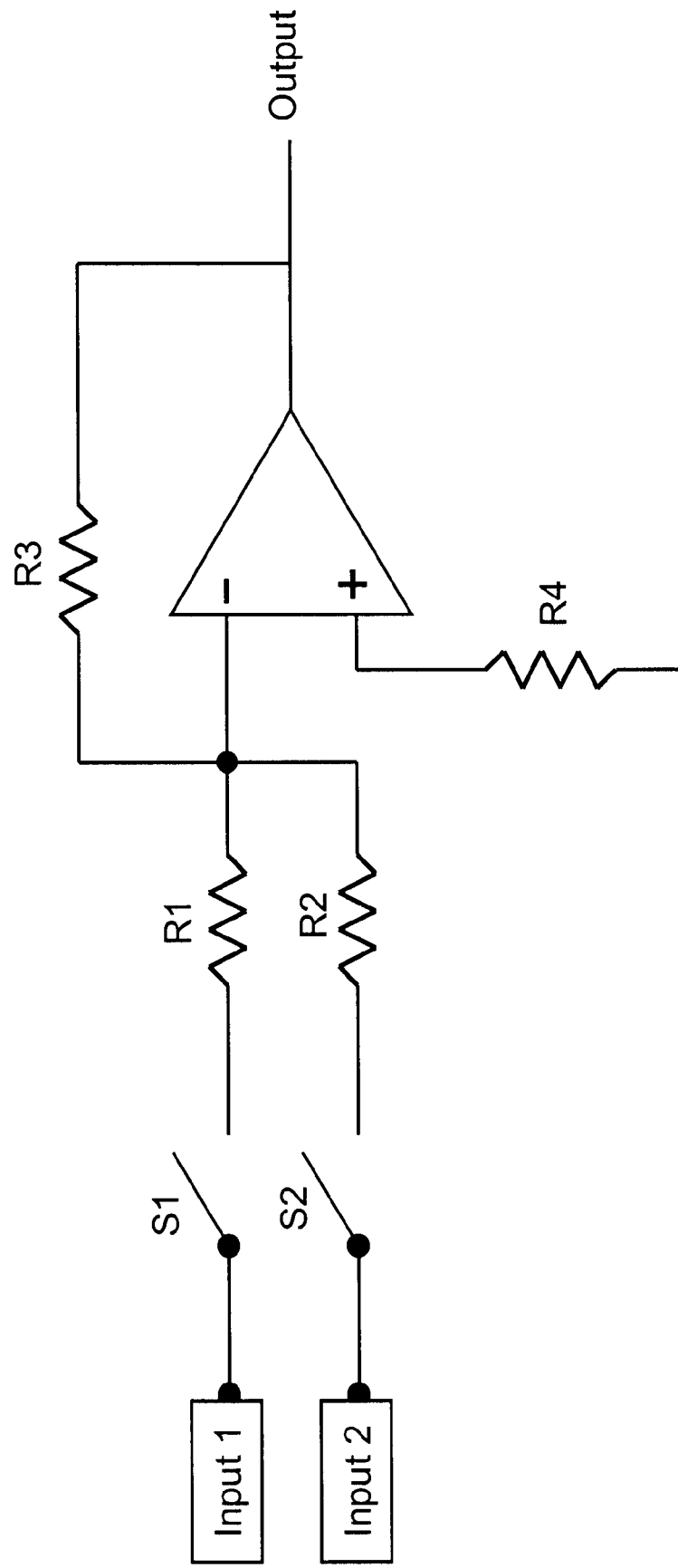
FIG. 5 demonstrates one example of an amplifier used in the image sensor of FIG. 3.

FIG. 5 illustrate one implementation of amplifier 314 of FIG. 3. The circuit is known to those skilled in the art and the output of amplifier 314 can be expressed as:

When S1 is turned on:

$$\text{Output} = (R3R/1)\text{Input1}; \quad (1)$$

When S2 is turned on:

$$\text{Output} = (R3/R2)\text{Input2}; \quad (2)$$

When both S1 and S2 are turned on:

$$\text{Output} = R3(\text{Input1}/R1 + \text{Input2}/R2); \quad (3)$$

It should be noted that a negative sign is omitted for simplicity and the resistance value of R1, R2 and R3 can be so adjusted that the output satisfies a particular design requirement.

Figure 6A:
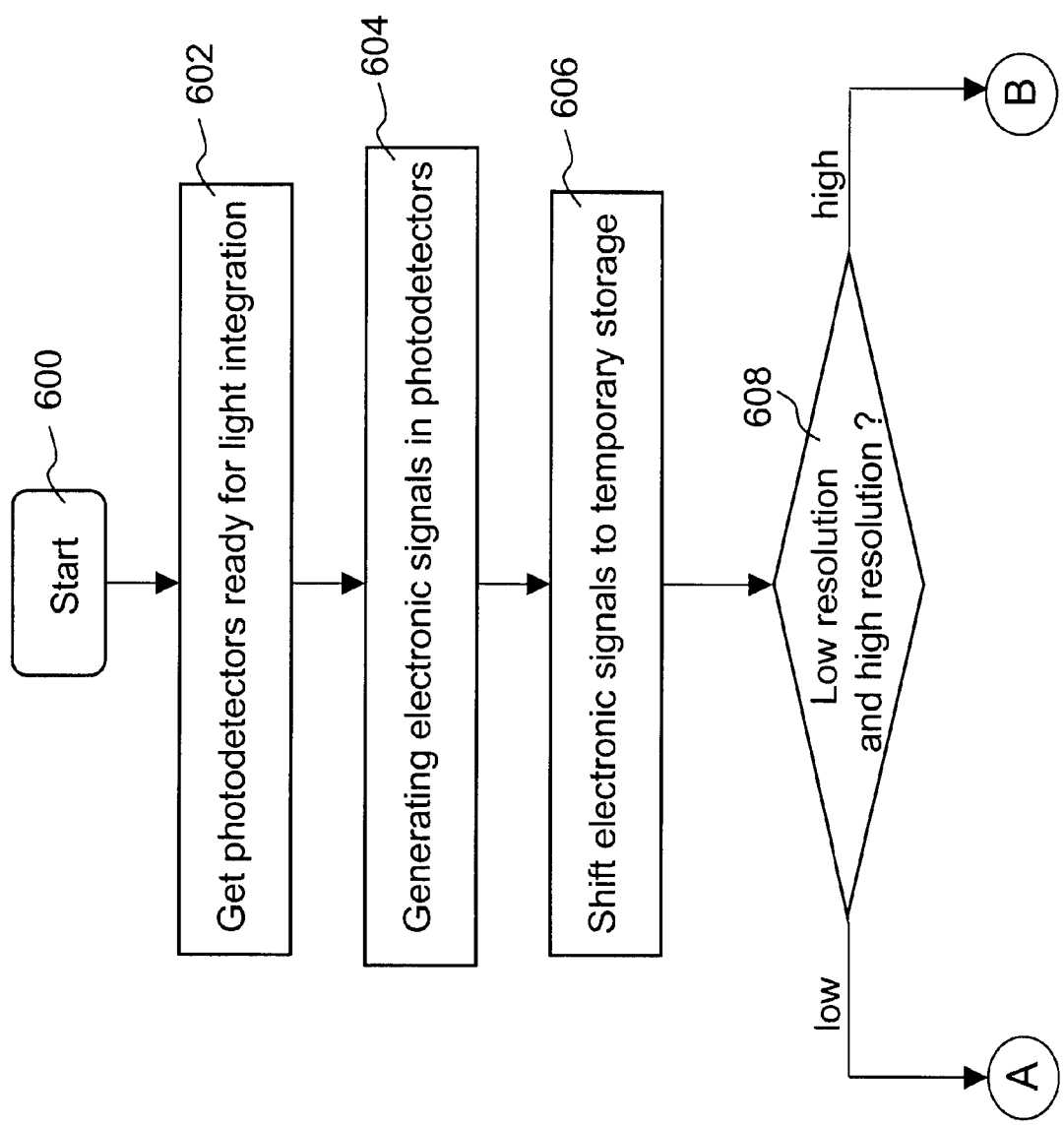
FIGS. 6a–b show a process flowchart of the present invention according to one embodiment.
Figure 6B:
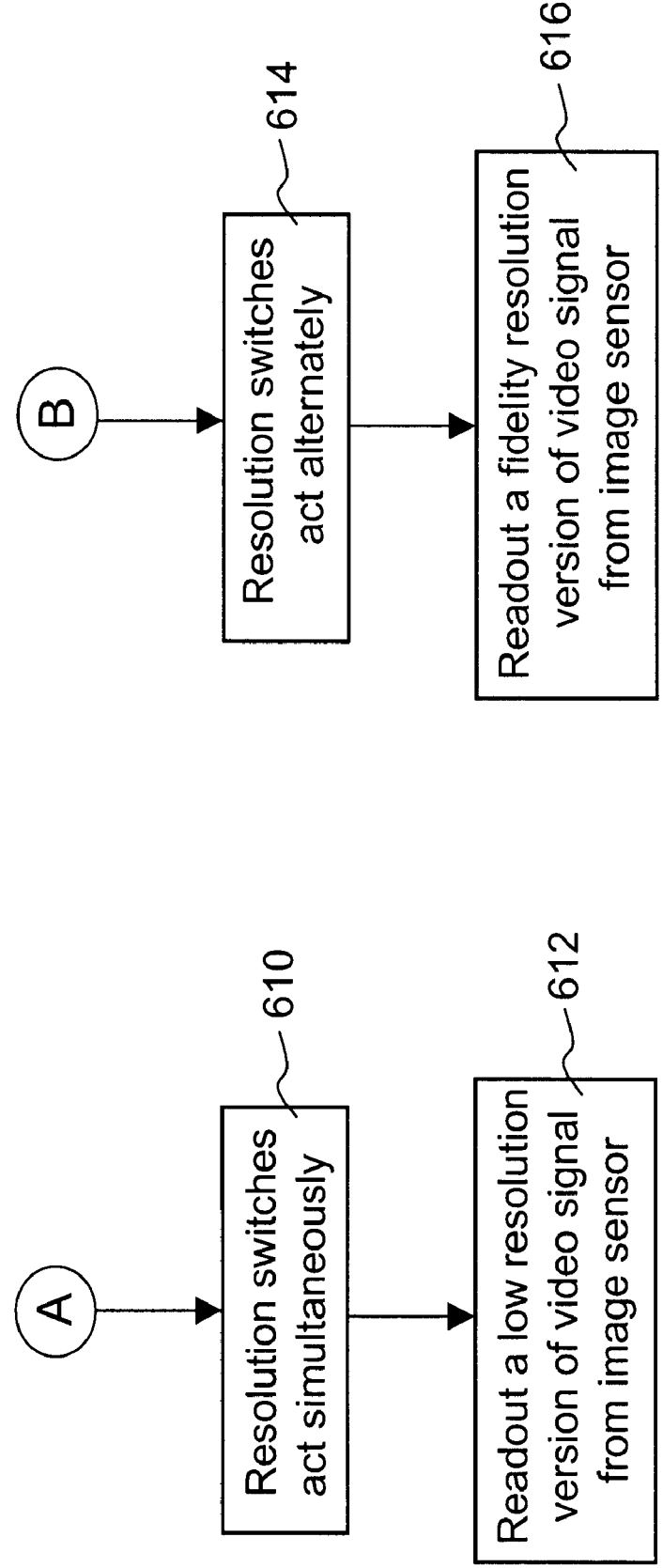

FIGS. 6A and 6B show a process flowchart of the present invention according to one embodiment and should be understood in conjunction with the rest of drawings. At 602, the photodetectors in an image sensor are ready for exposure. Typically, the photodetectors have been charged to a predefined level, e.g. Vcc. At 604, the image sensor is activated, which causes the photodetectors to accumulate photons in the incident light and meanwhile to start discharging process, generating electronic signals. As soon as the image sensor is stopped imaging, the photodetectors shift the generated electronic signals to a temporary storage at 606, typically to respective capacitors.

At 608, the image sensor receives a resolution signal from, for example, the driver executed in a host computer or a setting that indicates what resolution of images or signals are sought. The resolution signal determines different operations of the resolution switches.

Low resolution:

Regardless the number of the switches in each group in the multiplexer, the resolution switches are turned on and off at the same time at 610. When the resolution switches are turned on (passing through), the electronic signals coupled to the turned on switches are all fed into the following amplifier that produces a video signal derived from all the inputs at 612 according to the process relationship (3)

High resolution:

The number of the switches in each group in the multiplexer determines the number of the resolution switches in use. As an example shown in FIG. 3, the switches in the multiplexer are grouped into two groups, hence two resolution switches are used. The two resolution switches are turned on of off alternately, name if one is on, the other one is off. At 614, if there are more resolution switches, the switches act sequentially. As a result, electronic signals coupled to the resolution switches are respectively fed to the following amplifier that produces a video signal derived from the inputs at 616 according to the process relationship (1) or (2).

It is by now appreciated by those skilled in the art that the present invention can be advantageously used in image sensors for many image sensing modules and systems. Image sensors using the present invention that can be designed smaller by reducing the number of shift registers in use and further the overall performance thereof is increased.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

What is claimed is:

1. An improved image sensor comprising:
    an array of photodetectors and storage capacitors, each of the photodetectors, connected to one of the storage capacitors through a dumping switch, responsive to light impinged thereupon and independently producing an electronic signal after the photodetectors are collectively reset by a reset signal, wherein the electronic signal from each of the photodetectors is transferred to the storage capacitor thereof when the dumping switch is closed;
    a multiplexer comprising a plurality of groups of switches, each of the switches coupled to one of the storage capacitors; the groups of switches being serially turned on in synchrony with a clock control signal; wherein when one of the groups of switches are turned on, respective electronic signals from the storage capacitors coupled by the one of the groups of switches are respectively read out; and
    a number of resolution switches, each operating in synchrony with the clock control signal and receiving the respective electronic signals.

2. The improved image sensor as recited in claim 1, further comprising:
    an amplifier having inputs, each of the inputs coupled to one of the resolution switches and receiving one of the respective electronic signals when one of the resolution switches is turned on; wherein the one of the resolution switches receives the one of the respective electronic signals.

3. The improved image sensor as recited in claim 2, wherein the array of the photodetectors is configured as a one-dimensional image sensor array and fabricated from a complementary metal-oxide semiconductor (CMOS).

4. The improved image sensor as recited in claim 2, further comprising:
    a plurality of shift registers; each of the shift registers coupling to and controlling one group of switches in the multiplexer; wherein the one group of switches are turned on by a pulse from one of the shift registers coupled to the one group of switches.

5. The improved image sensor as recited in claim 4, wherein the respective electronic signals from the storage capacitors coupled by the one group of switches are sequentially and respectively coupled to the amplifier by the number of resolution switches acting sequentially and respectively.

6. The improved image sensor as recited in claim 4, wherein the respective electronic signals from the storage capacitors coupled by the one group of switches are coupled to the amplifier simultaneously by the number of resolution switches acting simultaneously.

7. An improved image sensor comprising:
    an array of N photodetectors, N storage capacitors and N dumping switches, each of the N photodetectors, connected to one of the N storage capacitors through one of the N dumping switches, responsive to light impinged thereupon and independently producing an electronic signal after the photodetectors are collectively reset by a reset signal, wherein the electronic signal from each of the N photodetectors is stored onto one of the N storage capacitors when a corresponding one of the N dumping switches is closed;
    a multiplexer comprising an array of N switches, each of the switches coupled to one of the N storage capacitors, the N switches grouped into M groups, each of the M groups including K switches; wherein K=N/M;
    an array of M data registers, each of the M data registers being coupled to one group of the switches in the M groups; and
    K resolution switches, each of the K resolution switches coupled to one of the K switches in each of M groups; and
    wherein one group of the switches are turned on simultaneously by one of the M data registers to cause the electronic signal in each of the N storage capacitors coupled by the one of the switches to read out to one of the K resolution switches.

8. The improved image sensor as recited in claim 7 further comprising an amplifier having K inputs, each of the K input coupled to one of the K resolution switches.

9. The improved image sensor as recited in claim 8, wherein the K resolution switches are turned on sequentially so that the amplifier outputs a signal comprising respective electronic signals from the N photodetectors.

10. The improved image sensor as recited in claim 8, wherein the K resolution switches are turned on simultaneously so that the amplifier outputs a signal merging electronic signals from each group in the M groups.

11. The improved image sensor as recited in claim 7, wherein the N photodetectors, the N switches, the M data registers, and the K resolution switches are all fabricated in one piece of a semiconductor material and packaged as a single device.

12. The improved image sensor as recited in claim 11, wherein the semiconductor material is complementary metal-oxide semiconductor (CMOS).

13. The improved image sensor as recited in claim 8, wherein the N photodetectors, the N switches, the M data registers, the K resolution switches, and the amplifier are all fabricated in one piece of a semiconductor material and packaged as a single device.

14. The improved image sensor as recited in claim 13, wherein the semiconductor material is complementary metal-oxide semiconductor (CMOS).

15. A method for controlling image resolution with an image sensor, the method comprising:

generating N electronic signals respectively from N photodetectors in the image sensor when the N photodetectors are exposed to an object;

shifting the N electronic signals respectively to N temporary memory cells after an exposure control signal stops;

turning on an array of N switches in a predefined manner, each of the N switches coupled to one of the N temporary memory cells; wherein the N switches are grouped into M groups, each of the M groups includes K switches and wherein K=N/M; and outputting the N electronic signals respectively from the N temporary memory cells to K resolution switches that are coupled to an amplifier subsequently producing an output signal.

16. The method as recited in claim 15, wherein the predefined manner is to turn on one group of the switches at a time, so that respective electronic signals are respectively received at the K resolution switches.

17. The method as recited in claim 16, wherein the K resolution switches are sequentially turned on so that the respective electronic signals are respectively input to the amplifier.

18. The method as recited in claim 16, wherein the K resolution switches are turned on all the time so that the respective electronic signals are collectively input to the amplifier.

19. The method as recited in claim 15; wherein M is equal to 2 and wherein the K resolution switches are alternately turned on.

* * * * *